Oct. 30, 1934.   R. E. GILLMOR   1,978,425
BALL GYROSCOPIC COMPASS
Filed Jan. 2, 1932   4 Sheets-Sheet 1

INVENTOR
REGINALD E. GILLMOR.
BY
*Herbert H. Thompson*
his ATTORNEY.

Oct. 30, 1934.    R. E. GILLMOR    1,978,425
BALL GYROSCOPIC COMPASS
Filed Jan. 2, 1932    4 Sheets-Sheet 2

INVENTOR
REGINALD E. GILLMOR.
BY Herbert H. Thompson
his ATTORNEY.

Oct. 30, 1934.    R. E. GILLMOR    1,978,425
BALL GYROSCOPIC COMPASS
Filed Jan. 2, 1932    4 Sheets-Sheet 4

INVENTOR
REGINALD E. GILLMOR.
BY Herbert H. Thompson
his ATTORNEY.

Patented Oct. 30, 1934

1,978,425

UNITED STATES PATENT OFFICE 1,978,425

BALL GYROSCOPIC COMPASS

Reginald E. Gillmor, New York, N. Y.

Application January 2, 1932, Serial No. 585,282

25 Claims. (Cl. 33—226)

The accuracy of gyro compasses is largely dependent upon the relation between the directive force of the gyroscopic element and the friction of suspension of that element. The friction is largely dependent upon the number and character of the bearings which are involved in the suspension of the sensitive element. The reliability of the compass is also considerably affected by the suspension bearings; that is to say, by the points of contact between the gyroscopic element and the surrounding (phantom) element.

It was, therefore, the object of my previous patent applications #321,587, filed November 24, 1928, and #493,729, filed November 6, 1930, to improve both the accuracy and reliability of gyroscopic compasses by providing a suspension system of the utmost simplicity and entirely without mechanical contact of any kind between the sensitive (gyroscopic) element and the non-sensitive (supporting or phantom) element. The present invention relates to a similar type of compass; that is to say, a compass of the ball type in which the sensitive element is a ball-like rotor supported on a film of air and free to spin and move on that film of air around all three axes. The present invention, however, avoids certain complexities and limitations of the types described in the two previous applications.

In the first of the aforesaid applications, the various means shown for accomplishing meridian seeking action involved the use of an axial liquid gravitation factor or ballistic which was made a part of the rotating system. The form of compass described in the second application made the meridian seeking action dependent upon the azimuthal relation of the gyroscopic or sensitive element and the follow-up or phantom element. Both of these constructions imposed certain difficulties and high cost of construction.

In the present invention, I retain all of the advantages resulting from air suspension but avoid the limitations of the systems previously described. This is accomplished by making the ball sensitive element entirely self-contained insofar as concerns (1) means for driving it, (2) means for making it meridian seeking and (3) means for damping. The means for effecting meridian seeking and damping, although mounted in the ball, do not rotate with it and, therefore, are not affected by centrifugal force. The means for attaining meridian seeking and damping are thus made independent of the accuracy of the follow-up system and of centrifugal force and of changes in the speed of rotation. The present invention also has several other advantages in that it provides a very simple solution to the problems of (1) avoiding the so-called ballistic and damping oscillations, (2) correcting the sensitive element to make it settle always on the true meridian, regardless of the speed and course of the ship on which it is mounted. Many features of my invention also have application to other types of gyro compasses and allied gyroscopic apparatus.

Referring to the drawings showing several preferred forms of the invention.

Figure 1:
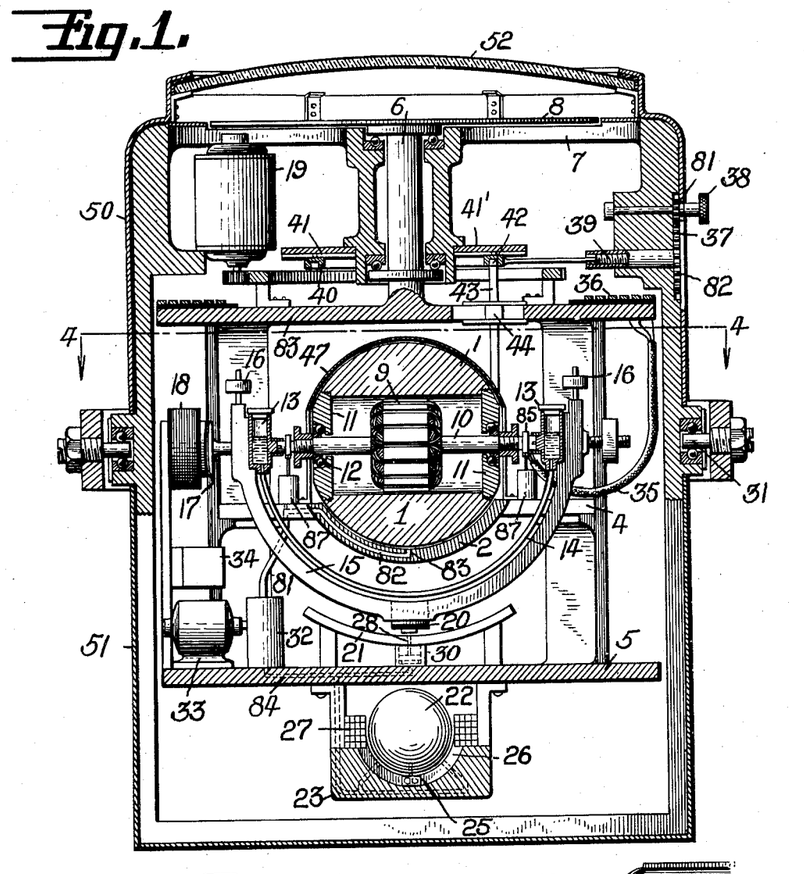
Fig. 1 is a diagrammatic drawing of one form of gyro compass embodying my invention.

Referring now to Fig. 1, the ball 1 rotates in a cup 2 but is separated from that cup by an air film which may be supplied from an outside source or may be created by the rotation of the ball as described in my previous applications. The cup 2 is carried on a spider frame 4 in the phantom or follow-up structure 5. The phantom is in turn supported by the stem 6 in the spider 7. The stem carries at its uppermost part a compass card 8. The ball is driven by a 3-phase A. C. stator 9 which is carried on a shaft 10. This shaft projects through end plates 11 and the ball bearings 12 between the shaft 10 and the end plates 11 insure a minimum of friction between the ball structure and the stator shaft. Secured to the ends of the stator shaft are the damping bottles 13 connected by small bore pipe 14. Also secured to the shaft 10 is the gravitational element or bail 15. Balancing weights 16 also form a part of the bail. Any suitable non-contacting non-torque applying follow-up system may be employed. For this purpose I also secure to the bail a soft iron armature 17 which cooperates with the transformer or inductances 18 and thereby serves, through a vacuum tube amplifier (not shown), to control the azimuth motor 19 in such manner as to cause the azimuth motor to cause the phantom structure to follow all azimuthal movements of the axis of the gyroscopic ball. One such system is outlined in the first of my aforesaid applications.

It will be seen that the gyroscopic or sensitive element, as shown in Fig. 1, comprises the ball, stator, stator shaft, bail, damping bottles and soft iron armature for controlling the follow-up. Suspension of the ball on an air film provides it with freedom around the axis of rotation, the vertical axis and the transverse horizontal axis.

When energized with three-phase alternating current, the stator will produce a torque on the ball around an axis coincident with the stator shaft. A corresponding reaction torque will occur, tending to rotate the stator. This reaction is taken by the bail secured to the ends of the stator shaft. In the form shown in Fig. 1 the reaction of the bail is in turn taken by the reaction magnet 20 which cooperates with the track 21. The track with which this electro-magnet cooperates has a width which is precisely equal to the width of the pole piece of the electromagnet. The face of the track is concentric with the face of the ball and, therefore, the electromagnet does not resist in any way movements of the ball around the horizontal axis transverse to the axis of rotation. Also, when the axis of the ball is substantially horizontal, the electromagnet does not resist movements of the ball around the vertical axis. Around the axis of rotation, however, any movement of the bail would tend to increase the air gap between the pole piece of the electromagnet and the track with which it cooperates and, therefore, the electro-magnet will prevent such rotative movement and will keep the bail in a substantially vertical plane.

For reasons which are well known to those skilled in the art, a pendulously controlled gyroscopic element such as that shown in Fig. 1 would be affected by quadrantal movements. I therefore prefer to stabilize this form of compass in one plane. It would be sufficient to stabilize the bail alone but I prefer to stabilize the entire compass as this has an important advantage in addition to the prevention of the so-called quadrantal or intercardinal error. This additional advantage arises from the prevention of the so-called gimbal error. In all forms of standard gyroscopic compasses accelerations in an intercardinal plane cause the nominal vertical of the compass structure to depart from the true vertical in an intercardinal plane, and this departure produces a rotative movement around the compass vertical, thus indicating a change of course when none has occurred. The gimbal errors so produced probably do not exceed ½ degree and, as they are constantly being reversed by swinging in the opposite direction, they are unimportant from a navigational point of view. When the compass is used with gun control apparatus, however, the gimbal error may produce an error in the pointing of the guns at the moment they are fired.

For the purpose of stabilizing the compass in its gimbals, I employ a ball gyroscope similar to the ball stabilizer described in my previous application No. 493,729. In Fig. 1 this ball gyroscope is shown at 22. The ball rotates in a cup 23 on a film of air which may be provided from an outside source or by the rotation of the ball or both. Attached to the end of the ball is a bearing 25 which cooperates with a curved trackway or slot 26 in the cup. The ball is driven by a stator 27 and this stator also serves the purpose of automatically centralizing the axis of the ball without oscillation.

When starting the compass shown in Fig. 1, I may employ means for giving it a very short meridian seeking period. This is accomplished by the locking or centering pin 28 which is automatically controlled by air supplied to the cylinder 29 which operates the piston 30 to which the pin is secured. The operation of this centering pin locks the bail around the horizontal axis, transverse to the axis of rotation, thus giving to the gyroscopic structure the pendulousness of the entire compass structure in its gimbals 31. After settling on the meridian, the pin is released.

Figure 16:
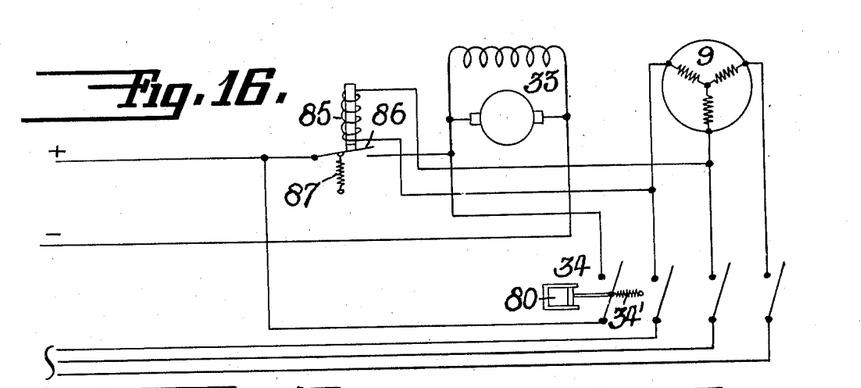
Fig. 16 is a wiring diagram showing the circuits for automatically controlling the supporting air film.

The air for supporting the ball when starting and for locking the centralizing pin is provided by the pump 32. Air from the pump is supplied to the bottom of the cup by pipe 81, channel 82 and orifice 83, while air for the piston 30 is supplied through channel 84. The pump is driven by the motor 33 and the motor is controlled by an automatic delayed opening switch 34. Any one of a number of standard delayed action switches may be used for this purpose, the switch being shown diagrammatically in Fig. 16 as normally biased to open by spring 34', but the opening being delayed by dashpot 80. The function of the switch is to close the circuit to the motor when the compass rotor circuit is closed and to keep the circuit to the motor closed for any period of time for which the switch is adjusted, and at the end of that period of time, to open the switch, thus stopping the motor and consequently the pump, thereby dropping the centralizing pin and at the same time removing the air supply through the ball cup, thus allowing the ball to create its own supporting film of air.

I may also provide automatic means for re-establishing the air film in case of failure of electrical supply for the rotor. For this purpose I have shown in Fig. 16 an electro-magnet 85 in circuit with the supply to the stator 9. As long as said magnet is excited it holds the switch 86 open but in case of failure of the supply said switch is closed by the spring 87 and the pump motor 33 started up again.

The current supply to the phantom and sensitive element is brought from the spider structure to the phantom structure by means of the slip rings 36 and cooperating brushes (not shown). Flexible lead-in wires 35 carry the 3-phase alternating current from the phantom structure to the hollow shaft on which the stator is mounted.

It is well known to those familiar with the art that gyroscopic compasses take up their position, not in the true meridian, but in a meridian which is the resultant of the earth's rotation and of the movement of the ship over the surface of the earth. Therefore, when the ship on which the compass is mounted changes course or speed, the compass must move from one virtual meridian to another, and, to avoid oscillation, this movement must take place at the same rate at which the change of virtual meridian takes place. The rate at which the meridian changes by reason of changes of course and speed is dependent upon (1) the latitude and (2) the rate of change in the N—S direction of course or speed. Therefore, to prevent oscillations of the compass, it must have a ballistic or pendulous characteristic of a certain definite value for each latitude. This has necessitated incorporating in certain refined types of compasses a ballistic adjustable for latitude.

To avoid the necessity for using an adjustable ballistic and at the same time to simplify the means for correcting the gyro compass for the difference between true and virtual meridians, I employ a method of correction which keeps the axis of the compass always on the true meridian. I am aware that means have been heretofore proposed for correcting the sensitive element so that it is always on the true meridian but in the previous types of compasses this could only be accomplished by extremely complicated devices which operated through the gimbal and suspension system to control the disposition of weights on the sensitive element. In the ball compass, as shown in Fig. 1, the sensitive element can be corrected to the true meridian by extremely simple means.

Figures 4, 5, 6, 7:
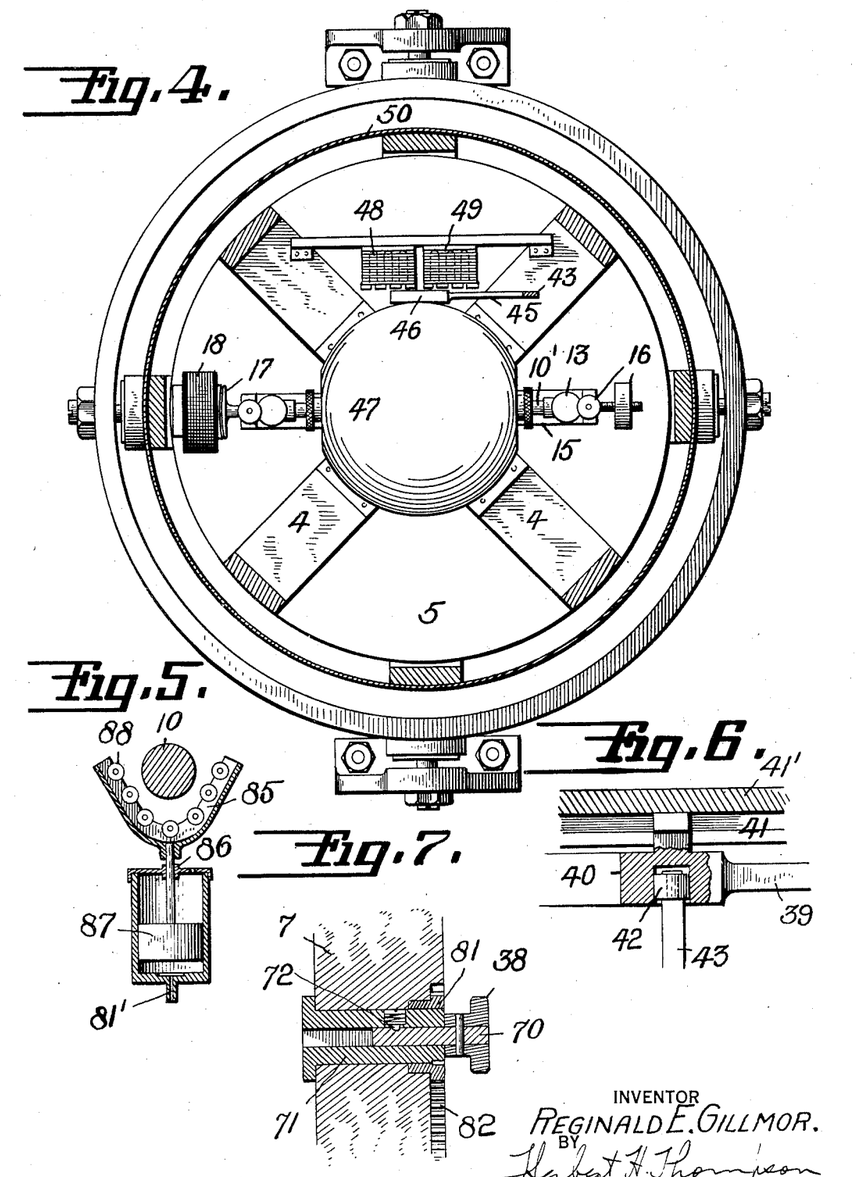
Fig. 4 is a sectional plan view of the compass shown in Fig. 1, the section being taken on line 4—4 of Fig. 1.
Fig. 5 is an alternative form of centralizer for cooperation with the stator shaft.
Fig. 6 is an enlarged sectional detail showing the means for mounting the eccentric ring on the correcting device.
Fig. 7 is an enlarged view of a modified form of corrector knob and shaft showing the method of making the knob removable.
Figure 17:
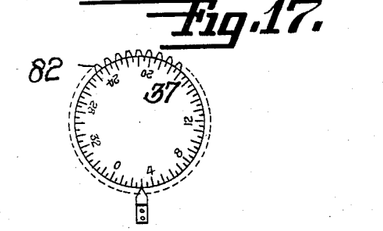
Fig. 17 is a detail of the latitude setting dial.

In Figs. 1 and 17 the corrector dial is shown at 37 as mounted on a shaft 39. This corrector dial is operated by the knurled head 38 through gearing 81 and 82. The corrector dial 37 is graduated in arbitrary figures from 0 to 36. Attached to the compass structure is a table (not shown) showing for each latitude and speed of ship the arbitrary corrector figure to be set on the dial. When the dial is set for this figure, it operates through internal threads in the shaft 39 to set the required eccentricity on the circular cam 40 which is carried in keyways 41 (see Figs. 1 and 6) on the under surface of plate 41' on the spider structure. A follower 42 mounted on the follow-up framework cooperates with the eccentric cam 40, takes from this cam the proper component of the correction for the course of the ship as shown by the compass (see also Fig. 6). Knob 38 may be made detachable so that cover 50 may be slipped in place. As shown in Fig. 7, the knob is mounted on a stem 70 which slips within the hollow shaft 71 of gear 81 and is held in place by lock pin 72.

The movements of the follower 42 serve to move laterally the shaft 43 carried by the slide 44 on cover plate 83 of the follow-up frame. The shaft 43 carries at its lower end an arm 45 (see Fig. 4) which in turn carries an armature 46 which is adjacent to the side of the ball housing 47. The armature serves to cover or uncover the faces of the rectilinear 3-phase A. C. stators 48 and 49. Each of these stators is wound in the opposite direction to the other, and since they are supplied with alternating current, a ripple of electromagnetic torque is constantly extending from the inner edges of the stators to their outer edges. This torque is very small but is sufficient to produce a considerable torque around the vertical axis of the ball. As the stators are wound in opposite directions, the torque produced by one equals the torque produced by the other, and the resultant torque on the ball would be zero were it not for the armature 46. The amount of the torque produced on the ball by either of the stators can be precisely governed by the extent to which the pole faces of the stator are covered by the armature 46. When the armature is in the position shown by Fig. 4, the torque produced on the ball by one of the stators cancels that produced by the other. When the corrector moves the armature over the face of stator 48, it results in decreasing the torque of that stator and increasing the torque of stator 49 and thus a torque will be produced on the ball in the direction of the torque emanating from stator 49. When the armature is moved in the opposite direction, stator 48 predominates, and the torque acting on the ball is reversed. The torque acting on the ball is precisely governable and, therefore, the correction mechanism acting to control this torque can produce a precisely predetermined effect in changing the settling point of the gyroscopic system by exerting a predetermined torque about the vertical axis.

In using this method of correction, I prefer to employ a gyroscopic system having a very long period; that is to say, instead of employing the period of 85 minutes for 45 degree latitude, which is now substantially the case with all standard gyro compasses, I employ a normal operating period of three to four hours or longer. With the ship at rest, the compass will normally be on the true meridian. As the ship accelerates, the corrector is kept set to the speed of the ship and thereby produces a torque on the sensitive element which causes a change of settling point equal and opposite to that which would be caused by the acceleration of the ship; thus the sensitive element does not move from the true meridian and consequently no ballistic oscillations take place. The period is made long enough so that no appreciable oscillation is set up during the change of speed or course.

To prevent access of dust to the compass and especially to the air film between the ball and the cup, I enclose the entire compass in a dust-proof housing. This housing comprises two tightly fitting covers 50 and 51. The upper cover carries a dome glass window 52 which permits a view of the compass card.

Figures 8, 9, 10, 11, 12, 13, 14, 15:
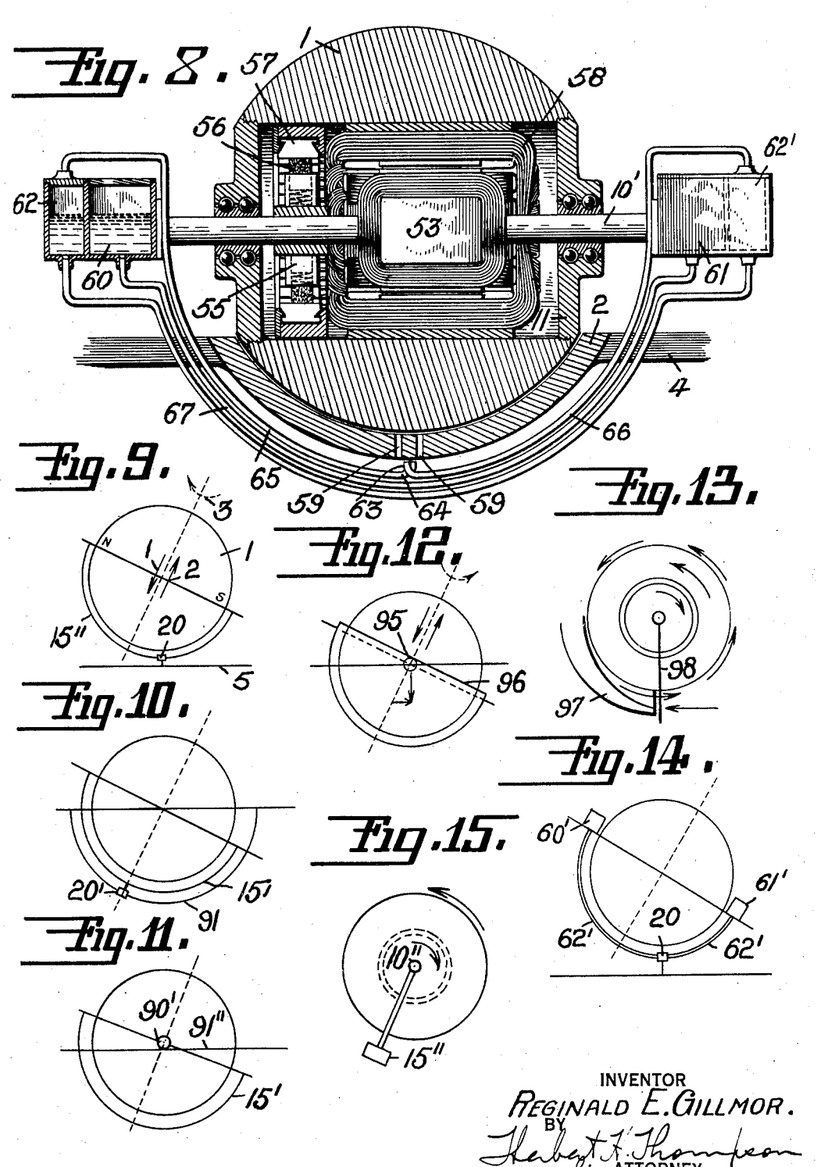
Fig. 8 is an alternative form of compass embodying means for driving by direct current and means for accomplishing meridian seeking and damping which are not affected by quadrantal movement and, therefore, make it unnecessary to stabilize the compass in its gimbals.
Figs. 9 to 15, inclusive, are diagrams showing various alternative arrangements of the ball, bail and reaction bearing.

The alternative form of compass shown in Fig. 8 permits the use of direct current for driving the ball. In this figure, 53 shows a fixed multi-pole field which is secured to a shaft 10' extending through end plates in the ball. Attached to the shaft is a brush structure carrying brush holders 55 and brushes 56. The brushes cooperate with the internal commutator 57 which is secured by forced fit inside of the axial hole in the ball. Also secured inside of the axial hole in the ball is the armature winding 58, the terminals of which are soldered to the commutator bars.

The cup for supporting the ball is much the same as in the form of compass shown in Fig. 1 but has two small holes 59. The rotation of the ball creates an air pressure in the bottom of the cup and this air pressure is always of a definite amount, depending upon the speed of rotation of the ball. The axis extending through the end plates of the ball carries two sets of bottles adapted to contain mercury, oil or other liquid. One of these sets 60 and 61 is used for securing meridian seeking action. The other set 62, 62' is used for securing damping.

In this form of compass the mercury in the bottles 60 and 61 will flow to the low side of the gyroscope upon inclination of the same and hence the gyroscope will behave as a top heavy gyro compass and revolve in a counter-earthwise direction. Due to the constriction of the pipe 67 between the two bottles, however, the liquid does not flow readily from one to the other and is, therefore, not appreciably affected by intercardinal rolling of the ship on which the compass is mounted. To damp such a compass it is also necessary to reverse the usual damping method and supply energy to instead of abstracting it from the system. By using a constricted pipe 67, the flow of oil between the bottles 62—62' is made out of phase with the tilting of the main gyroscope and the compass is damped. As the ball's axis is tilted by the rotation of the earth, the orifices 63 and 64 of the pipes 65 and 66 are brought into juxtaposition with one or the other of the holes in the cup, thus admitting air to one or the other of the damping bottles 62—62' in such manner as to blow the oil through the pipe 67' to the bottle on the high side.

An alternative form of centralizer for holding the shaft of the sensitive element when starting is shown by Fig. 5, which may be used in addition to or instead of supplying starting air through orifice 83. According to this arrangement, there is provided at each end of shaft 10 a U-shaped cage 85 normally out of engagement with the shaft but which is mounted on the piston rod 86 of the piston 87. In starting, air from the pump 32 is admitted to the cylinder through hole 81' raising the cage against the shaft 10 on the roller bearing 88, lifting the shaft and with it the ball 1 out of engagement with the cup 2. It is held in this position until the ball is up to speed when the air from the pump is cut off as explained above. This centralizer could also be made to serve another purpose in that an automatic means may be provided to operate it in case of failure of the electrical supply to the compass by connecting the cylinder to the pump 32 which is automatically controlled as explained above. This has the advantage of supporting the ball on the roller bearings shown in the centralizer and prevent it from damaging itself by striking the phantom element.

Figures 2, 3:
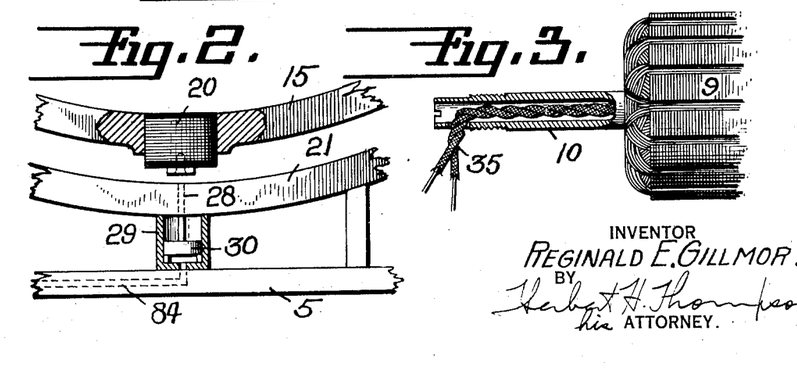
Fig. 2 is an enlarged section of the electromagnet and track for taking the reaction of the stator, also showing the pneumatically controlled centering pin for locking the bail when starting.
Fig. 3 is an enlarged view showing the method of leading in the wires to the stator.
Figure 19:
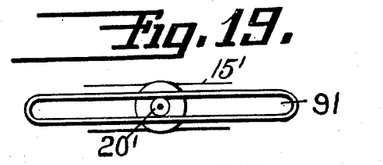
Fig. 19 is a detail view viewed from the bottom of a modified form connection between the bail on the gyroscope and the pendulous support.
Figure 20:
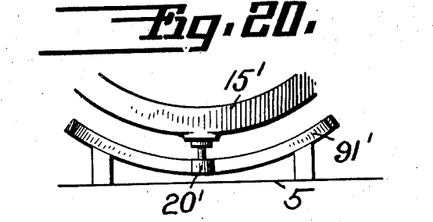
Fig. 20 is a side elevation of the same.

I have devised several alternative forms employing the axial stator shown in Fig. 1. The general arrangement of all of these forms is similar to Fig. 1 and, therefore, in describing them, it will be sufficient to show diagrammatically simply the ball, bail, reaction bearing and phantom as in Figs. 9 to 14 inclusive. In all of these figures, as well as in Fig. 1, the reaction bearing may be an electro-magnet cooperating with the track as shown in Fig. 2, or a roller bearing co-operating with a slotted track, as shown in Figs. 19 and 20 at 20' and 91 respectively. The bearing may be mounted on the bail 15' and the slotted track on the phantom 5 as in these figures, or the trackway 92 (Fig. 21) may be mounted on the bail 15'' and the roller bearing 20 on the phantom 5.

Figure 21:
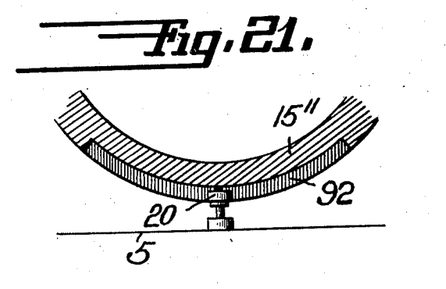
Fig. 21 is a side elevation of another modified form of connection between the bail and pendulous support, also shown diagrammatically in Figs. 9 and 14.

In Figs. 9 and 21 I show in its simplest diagrammatic form an arrangement wherein the reaction bearing 20 is mounted on the phantom and cooperates with the pendulous bail 15''. This form of compass would be self-damping without the aid of damping bottles. The damping action can be understood by considering the forces acting on the ball when the axis of the compass is tilted by the action of the earth's rotation. As shown in Fig. 9, the axis of the compass is pointing east and the north end is consequently tilted upwards. The rotation of the ball is shown by the arrow 2. The reaction of the stator is shown by the arrow 1. This reaction of the stator produces a torque on the bail which is downward through the paper at the point where the reaction bearing 20 engages the bail. Therefore, the reaction bearing is exerting a pressure on the bail which is upward through the paper. This pressure has two components, one around the axis of rotation of the ball, which prevents rotation of the bail, and the other around the vertical axis at right angles to the axis of rotation as shown by the dotted arrow 3. The component around the vertical axis produces precession around the transverse horizontal axis, thus tending to restore the axis of rotation to the horizontal, thereby damping the oscillations of the compass around the meridian. The work required to damp is supplied by the azimuth motor. This form of compass should be stabilized as it employs a pendulous bail.

In Fig. 14, as in Fig. 8, I have substituted in place of the pendulous bail a liquid pendulum comprising two bottles 60'—61' connected by a small tubing 62'. The reaction bearing 20 in this case is mounted on the phantom and co-operates with the track on the bail as in Fig. 9. The components of torque exerted by the reaction bearing are similar (although opposite in each case) as in the case of Fig. 9 and, therefore, the axis of the gyroscopic system will be restored to the horizontal and the oscillations of the compass around the meridian would be damped. The delayed action liquid ballistic employed in this form of compass probably makes it unnecessary to stabilize the compass in its gimbals, although stabilization may, of course, be retained, if desired.

Figs. 10, 19 and 20 show the effect of mounting the reaction bearing 20' on the bail and having it cooperate with a circular track 91 on the phantom. This is the form of compass shown in Fig. 1 and one form of reaction bearing is shown in Figs. 19 and 20. It will be seen that from this diagram that the torque produced by the reaction bearing is entirely around the axis of rotation of the ball under all conditions and, therefore, no damping component around the vertical axis is produced. This has the advantage of permitting the employment of damping around the horizontal axis by liquid flow (as in Fig. 1 or Fig. 8), thus avoiding the so-called tangent latitude error which complicates the correcting mechanism.

Fig. 11 shows the effect of mounting the reaction bearing on the side of the ball on an axis coincident with the transverse horizontal axis of the ball. In this figure the steady bearing 90' is fixed to the bail structure 15' and cooperates with a horizontal track 91'' on the phantom. The effect of this arrangement is the same as that in Figs. 1 and 10; that is to say, the steady bearing produces torques around the axis of rotation only and has no damping effect.

Fig. 12 shows the effect of mounting the reaction bearing 95 on the phantom at the side of the ball and having it cooperate with a horizontal track 96 secured to the bail structure. This arrangement produces a component around the vertical axis of the ball at right angles to its axis of rotation in the direction shown by the dotted arrow and would, therefore, undamp the ball's oscillations, i. e., increase those oscillations.

Figure 18:
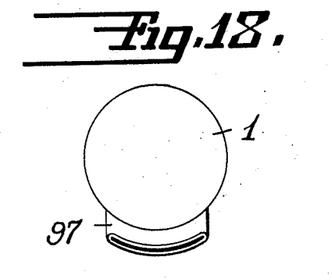
Fig. 18 is a diagrammatic view taken at right angles to Fig. 13.

Figs. 13 and 18 show that the air currents derived from the equator of the ball could be used to take the stator reactions, thus avoiding the use of a pendulum in holding the stator against its tendency to rotate. In considering this, it should be borne in mind that no expenditure of energy is required, i. e., no work is done to hold the stator. The air currents from the ball could be concentrated by a funnel-like device 97 to exert practically any desired torque on a vane 98 on the stator. The air currents could also be used by appropriate disposition of the funnel to produce the action of the reaction bearings shown in the other figures.

Still another alternative for providing meridian seeking and damping qualities is illustrated diagrammatically in Fig. 15 in which a south elevation of the compass is shown. In this form the pendulum 15″ attached to the stator shaft 10″ is allowed to swing free, thus avoiding the use of a reaction bearing. The reaction of the stator would in this case result in displacing the pendulum from the vertical to an extent such that the pendulous torque would exactly equal the reaction torque of the stator.

We have found from experiment that this arrangement produces a very satisfactory degree of damping. The damping action probably results from the fact that, as the inclination of the axis of the gyroscopic element increases, the reaction of the pendulum on the stator decreases and thus the pendulum swings out farther and farther from the vertical. As the pendulum swings away from the vertical, its ballistic action, i. e., its torque around the transverse horizontal axis of the ball, decreases, thus decreasing the rate of precession around the vertical axis and thereby causing the gyroscopic element to perform a spiral oscillation toward the meridian and the horizontal. It will be seen by those familiar with the art that the energy for damping the oscillations of the gyroscopic element is in this case derived from the stator in that the stator must do work to swing the pendulum out to greater and greater deviations from the vertical as the axis of the gyroscopic element tilts.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A gyroscopic compass comprising a ball-like rotor, means for spinning said ball about a substantially horizontal axis, means for supporting said ball when spinning on a film of air for freedom for turning in any direction, gravitational means without the ball, and journal bearings within the ball along the spinning axis thereof for non-rotatably suspending said means from the ball.

2. In a ball compass, the combination with the ball, of a cup-shaped member for supporting the same on the air film generated by the rotation of the ball, electrical means for spinning the ball, and gravitationally responsive means journalled within but non-rotatable with the ball for imparting meridian seeking properties thereto.

3. A gyroscopic compass comprising a ball, means for spinning said ball about a normally horizontal axis, means for supporting said ball when spinning on a film of air for freedom for turning in any direction, gravitationally responsive means journalled within but non-rotatable with the ball both for imparting north seeking properties thereto and for damping the oscillations of the ball.

4. In a ball type gyro compass, a ball-like rotor having an axial bore, means for spinning the same about the axis of said bore, a cup for supporting said ball at its periphery on an air film when spinning, and gravitational means journalled within said bore for imparting meridian seeking properties thereto.

5. In a ball type gyro compass, a ball-like rotor having an axial bore, a cup furnishing a supporting bearing for the under surface of the ball, a shaft journalled within the ball, means on said shaft for spinning the ball, and means for resisting the reactive turning of said shaft.

6. In a ball type gyro compass, a ball-like rotor having an axial bore, a cup furnishing a supporting bearing for the under surface of the ball, a shaft journalled within the ball, means on said shaft for spinning the ball, and gravitationally responsive means on said shaft for imparting meridian seeking properties to the ball.

7. In a ball type gyro compass, a ball-like rotor having an axial bore, a cup furnishing a supporting bearing for the under surface of the ball, a shaft journalled within the ball, means on said shaft for spinning the ball, and gravitational means on said shaft acting about an E—W axis for imparting meridian seeking properties to the ball and means for resisting the reactive turning of the shaft.

8. In a gyroscopic compass, the combination with the gyroscope, a single spherical bearing for universally supporting the gyroscope for spinning about one horizontal axis, oscillating about another horizontal axis and turning about a vertical axis, a stator for spinning said gyroscope the weight of which is also supported on said bearing, rotor bearings between said stator and rotor, and pendulous means for preventing reactive turning of said stator.

9. A gyroscopic compass comprising a hollow ball-like rotor, means for spinning said ball about a substantially horizontal axis, means for supporting said ball when spinning on a film of air for freedom for turning in any direction, and gravitationally responsive means journalled within the ball for imparting north seeking properties thereto.

10. In a ship's gyroscopic compass of the ball type, variable electro-magnetic means for exerting a continuous torque about the vertical axis thereof, and means settable in accordance with the speed, course and latitude of the ship for governing said torque-applying means whereby the settling point is kept constant.

11. In a ship's gyroscopic compass of the ball type, variable electro-magnetic means for exerting a continuous torque about the vertical axis thereof in either direction, and means settable in accordance with the speed, course and latitude of the ship for governing the magnitude and direction of said torque-applying means whereby the settling point is kept constant.

12. In a ball type gyro compass, a ball-like rotor having an axial bore, a cup furnishing a supporting bearing for the under surface of the ball, a shaft journalled within the ball, a follow-up support for the cup, means on said shaft for spinning the ball, gravitationally responsive means on said shaft for imparting meridian seeking properties to the ball, and a coupling between said means and said support in the E—W plane only for receiving the reactive driving torque on the stator.

13. In a ball type gyro compass, a ball-like rotor having an axial bore, a cup furnishing a supporting bearing for the under surface of the ball, a shaft journalled within the ball, a follow-up support for the cup, means on said shaft for spinning the ball, gravitationally responsive means on said shaft for imparting meridian seeking properties to the ball, and a coupling fixed to said support but slidably connected to said gravitational means in the N—S plane whereby damping is secured.

14. In a ball type gyro compass, a ball-like rotor having an axial bore, a cup furnishing a supporting bearing for the under surface of the ball, a shaft journalled within the ball, a follow-up support for the cup, means on said shaft for spinning the ball, gravitationally responsive means on said shaft for imparting meridian seeking properties to the ball, and a coupling fixed to said gravitational means but slidably connected to said support in the N—S plane.

15. In a ball gyroscope, electrical means for spinning the ball on a self-generated air film, means for supplying compressed air to the ball in starting, and automatic means for reestablishing the air supply in case the electrical supply fails.

16. As a means for maintaining a fixed settling point in a gyro compass having a rotor, regardless of changes in speed, course and latitude, an electro-magnetic element adjacent the rotor of the compass and adapted to exert opposite torques about the vertical axis thereof, movable means for varying the relative strength of said torques, and means settable in accordance with speed and latitude and varied with the turning of the compass mounting for shifting said movable means whereby said electro-magnetic element applies, a corrective torque to maintain the compass on the true meridian.

17. As a means for maintaining a fixed settling point in a gyro compass having a rotor, regardless of changes in speed, course and latitude, an electro-magnetic element adjacent the rotor of the compass and adapted to exert a torque about the vertical axis thereof, movable means for varying the strength and direction of said torque, and means settable in accordance with speed and latitude and varied with the turning of the compass mounting for shifting said movable means whereby said electro-magnetic element applies a corrective torque to maintain the compass on the true meridian.

18. In a gyroscopic compass, a rotatable element, a motor for spinning the same about a normally horizontal axis and having its armature mounted on said element and its stator journaled thereon and supported thereby, means connected to the stator for preventing reactive rotation thereof, and a spherical bearing for supporting said element, armature and stator for turning about a vertical axis and for oscillation about a horizontal axis at an angle to the spinning axis and also furnishing the spinning bearing for said element and armature.

19. In a gyroscopic compass, a rotating element, a spinning motor for spinning the same about a normally horizontal axis and having its armature mounted on said element and bearings journaling and supporting its stator thereon, means for imparting gravitational control to said compass through said stator bearings, and a spherical bearing for supporting said rotating element, armature and stator for turning about a vertical axis and for oscillation about a horizontal axis at an angle to the spinning axis and also furnishing the spinning bearing for said element and armature.

20. In a gyroscopic compass, a rotating element, a spinning motor for spinning the same about a normally horizontal axis and having its armature mounted on said element and its stator journaled thereon and supported thereby, said stator being pendulous for imparting gravitational control to said compass, and a spherical bearing for supporting said rotating element, armature and stator for turning about a vertical axis and for oscillation about a horizontal axis at an angle to the spinning axis and also furnishing the spinning bearing for said element and armature.

21. In a gyroscopic compass, the combination with the gyroscope, a single spherical bearing for universally supporting the gyroscope for spinning about one horizontal axis, oscillation about another horizontal axis and turning about a vertical axis, a stator for spinning said gyroscope, the weight of which is also supported on said bearing, rotor bearings between said stator and rotor, means for preventing reactive turning of said stator, and a follow-up support for said spherical bearing.

22. In a gyroscopic compass, the combination with the gyroscope, a single spherical bearing for universally supporting the gyroscope for spinning about one horizontal axis, oscillation about another horizontal axis and turning about a vertical axis, a stator for spinning said gyroscope, the weight of which is also supported on said bearing, rotor bearings between said stator and rotor, and means for preventing reactive turning of said stator without damping the compass.

23. A gyroscopic compass comprising a hollow ball-like rotor, means for spinning said ball about a substantially horizontal axis, a cup for supporting said ball when spinning on a film of air for freedom for turning in any direction, a pendulous support for said cup, gravitationally responsive means journaled within the ball for imparting north seeking properties thereto, a slidable connection in the N—S direction between said support and said last-named spinning means to take the reaction and damp the compass, and gyroscopic means for stabilizing said support.

24. A gyroscopic compass comprising a ball-like rotor, means for spinning said ball about a substantially horizontal axis, means for supporting said ball when spinning on a film of air for freedom for turning in any direction, electromagnetic means adjacent the periphery of the ball for exerting a direct torque about the vertical axis thereof, and means for varying said torque to maintain the settling point constant.

25. A gyroscopic compass comprising a hollow ball-like rotor, means for spinning said ball about a substantially horizontal axis, means for supporting said ball when spinning on a film of air for freedom for turning in any direction, gravitationally responsive means journalled within the ball for imparting north seeking properties thereto, electro-magnetic means adjacent the periphery of the ball for exerting a direct torque about the vertical axis theerof, and means for varying said torque to maintain the settling point constant.

REGINALD E. GILLMOR.